(12) United States Patent  
Kafka

(10) Patent No.: US 7,630,481 B2
(45) Date of Patent: Dec. 8, 2009

(54) SYSTEMS AND METHODS FOR PROVIDING A TELECOMMUNICATIONS EXTENSION SERVICE FOR MULTIPLE TELECOMMUNICATIONS UNITS

(75) Inventor: Henry Kafka, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 260 days.

(21) Appl. No.: 11/218,010

(22) Filed: Sep. 1, 2005

(65) Prior Publication Data

US 2007/0047704 A1 Mar. 1, 2007

(51) Int. Cl.
*H04M 3/42* (2006.01)

(52) U.S. Cl. ............... 379/211.02; 379/211.03; 379/211.04; 455/414.1; 455/417

(58) Field of Classification Search ......... 379/211.04, 379/211.03, 211.02; 455/417, 414.1
See application file for complete search history.

(56) References Cited

U.S. PATENT DOCUMENTS

| | | | |
|---|---|---|---|
| 5,963,864 A | 10/1999 | O'Neil et al. ............ 455/445 |
| 6,021,176 A | 2/2000 | McKendry et al. | |
| 6,058,178 A * | 5/2000 | McKendry et al. ..... 379/212.01 |
| 7,039,395 B2 * | 5/2006 | Kundaje et al. .......... 455/417 |
| 2003/0002645 A1 | 1/2003 | Worsham et al. | |
| 2003/0179865 A1 | 9/2003 | Stillman et al. | |
| 2006/0067300 A1 * | 3/2006 | Poustchi et al. ......... 370/352 |
| 2006/0104431 A1 * | 5/2006 | Emery et al. ......... 379/211.04 |
| 2006/0153353 A1 * | 7/2006 | O'Neil ............... 379/211.02 |

OTHER PUBLICATIONS

U.S. Appl. No. 11/217,174, filed Sep. 1, 2005, entitled "Systems and Methods for Providing Call Monitoring Service for Multiple Telecommunications Units".
PTO communication dated Dec. 15, 2008 in U.S. Appl. No. 11/217,174.

* cited by examiner

*Primary Examiner*—Nick Corsaro
*Assistant Examiner*—Shannon R Brooks
(74) *Attorney, Agent, or Firm*—Jennifer Pearson Medlin; Morris Manning & Martin, LLP

(57) ABSTRACT

A system and method provide a telecommunications extension service for a subscriber. The system allows a subscriber to identify one or more telecommunications units to serve as extensions of one of the subscriber's telecommunications units when a call is directed to the subscriber's telecommunications unit. A list of numbers associated with telecommunications units to serve as extensions is maintained by the subscriber and may be stored at a service control point. Upon receipt of a call directed to the subscriber's telecommunications unit, ringing is provided to the subscriber's telecommunications unit and the telecommunications units serving as extensions. After the call is answered by the first telecommunications unit to be answered, the remaining telecommunications units can join the in-progress call.

17 Claims, 6 Drawing Sheets

SYSTEMS AND METHODS FOR PROVIDING A TELECOMMUNICATIONS EXTENSION SERVICE FOR MULTIPLE TELECOMMUNICATIONS UNITS

FIELD OF THE INVENTION

The present invention relates generally to telecommunications services and, more particularly, to systems and methods for providing a telecommunications extension service for multiple telecommunications units.

BACKGROUND OF THE INVENTION

Increasingly in today's society, a need exists for individuals to "stay in touch," whether it is with business contacts, co-workers, friends, or family members. Primary avenues for individuals to stay in touch are the telecommunications networks, both wireline and wireless. These telecommunication methods have certain drawbacks, however. Significantly, if an individual is not sufficiently proximate to their telecommunication device, the individual cannot answer an incoming call before it stops ringing, in which case the call often goes unanswered. The advent of answering machines and voice messaging systems has ameliorated this problem, but even these technological advancements are not acceptable for all situations.

Individuals who do utilize mobile wireless telecommunications devices and wireline telecommunications devices typically have separate directory numbers for each device. However, being associated with multiple directory numbers has certain drawbacks. In particular, potential callers generally have difficulty remembering or otherwise keeping up with somebody's mobile directory numbers and wireless directory numbers, resulting in the potential caller calling the one directory number he or she remembers and not trying to contact the individual at any of the other directory numbers. If the individual is away from the telecommunications device associated with the called directory number, then the call is missed even though the individual may be proximate to another telecommunications device associated with a different directory number previously provided to the potential caller.

One known solution to these problems is the so-called "simultaneous ring" telephone service. According to the typical simultaneous ring service, when a called party receives an incoming call directed to their wireline telephone, telephone devices associated with the wireline telephone ring simultaneously, allowing the called party to answer the most accessible phone. For example, a person may have the simultaneous ring service established for her home telephone, such that whenever a calling party calls her at home, not only does her home telephone ring, but her wireless telephone also rings. If the wireless telephone is answered first, the incoming call is connected with the wireless telephone, and the ringing to her home telephone is discontinued, whereby the call is connected only to the wireless telephone, and the home telephone cannot be connected with the incoming call after the connection of the incoming call with the wireless telephone. Thus, a person proximate to the home phone who wants to join the call occurring between the calling party and the person at the wireless telephone is prohibited from doing so based on the typical simultaneous ring service.

Accordingly, there exits a need for a simultaneous ring service that can simultaneously ring any number of associated telecommunications devices, and once one of the telecommunication devices is answered, allow a different associated telecommunication device to join in the call with the calling party and the answered telecommunication device.

SUMMARY OF THE INVENTION

The present invention is directed to systems and methods for providing a telecommunications extension service for a service subscriber. The system utilizes the functionality of the Advanced Intelligent Network ("AIN"), and allows the subscriber's designated wireline, wireless, and Internet Protocol ("IP") telecommunications units to serve as extensions of one of the subscriber's telecommunications units designated by the subscriber as the host telecommunications unit.

According to one embodiment of the present invention, the system includes a host switch in communication with a telecommunications unit associated with the subscriber and a service control point in communication with the host switch. The host switch receives an incoming communication from a calling party directed to the telecommunications unit, which is also associated with a plurality of other telecommunications units to be simultaneously rung. Once the host switch receives the incoming communication, the host switch queries the service control point for processing instructions for the incoming communication.

In response to the query, the service control point provides the host switch instructions to place outgoing communications to the telecommunications unit and each of the other telecommunications units to be simultaneously rung. Once the host switch receives the processing instructions from the service control point, the host switch places outgoing communications to the telecommunications unit and each of the other telecommunications units. The first telecommunications unit to be answered is connected by the host switch to the incoming communication and each of the outgoing communications other than the first answered telecommunications unit is then dropped.

After connecting the first telecommunications unit to be answered and dropping all of the other outgoing communications, the host switch connects one of the unanswered telecommunications units to the incoming communication in response to receiving notification from the unanswered telecommunications unit to connect to the incoming communication, while maintaining the connection between the incoming communication and the first telecommunications unit to be answered.

According to another embodiment of the present invention, after the host switch connects the incoming communication with the first telecommunications unit to be answered, the host switch notifies each of the telecommunications units other than the first telecommunications unit to be answered that the incoming communication is connected. Once the host switch detects disconnection of the calling party associated with the incoming communication or the first answered telecommunications unit, the host switch disconnects the incoming communication and notifies each of the telecommunications units other than the first answered telecommunications unit that the call is disconnected.

According to yet another embodiment of the present invention, a system and method are provided in which a subscriber may identify any number of telecommunications units to serve as extensions of one of the subscriber's telecommunications units, designated as the host telecommunications unit. The subscriber may administer the list of numbers to serve as extensions through a voice-driven administration system or through the use of a World Wide Web ("WWW") site. Once the subscriber has identified the list of telecommunications units to serve as extensions, any communications directed toward the subscriber's host telecommunications unit will cause each of the telecommunications units to be rung simultaneously.

In particular, according to this embodiment of the present invention, when a communication is directed toward the subscriber's host telecommunications unit, the list of telecommunications units to serve as extensions of the host telecommunications unit is retrieved. For each of the telecommunications units on the list, an outgoing communication is placed to simultaneously ring these units. The subscriber's host telecommunications unit is also rung simultaneously. The first telecommunications unit to be answered is connected to the incoming communication and each of the outgoing communications other than the first answered telecommunications unit is then dropped. After the outgoing communications are dropped, one of the unanswered telecommunications units sends notification to connect to the incoming communication, and in response, the unanswered telecommunications unit is connected to the incoming communication In this manner, any of the telecommunications units designated by the subscriber as the host telecommunications unit or extensions of the host telecommunications can join the incoming communication as long as the communication is connected.

These and other benefits of the present invention will be apparent from the following Detailed Description.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION OF THE PREFERRED EMBODIMENT

Figure 1:
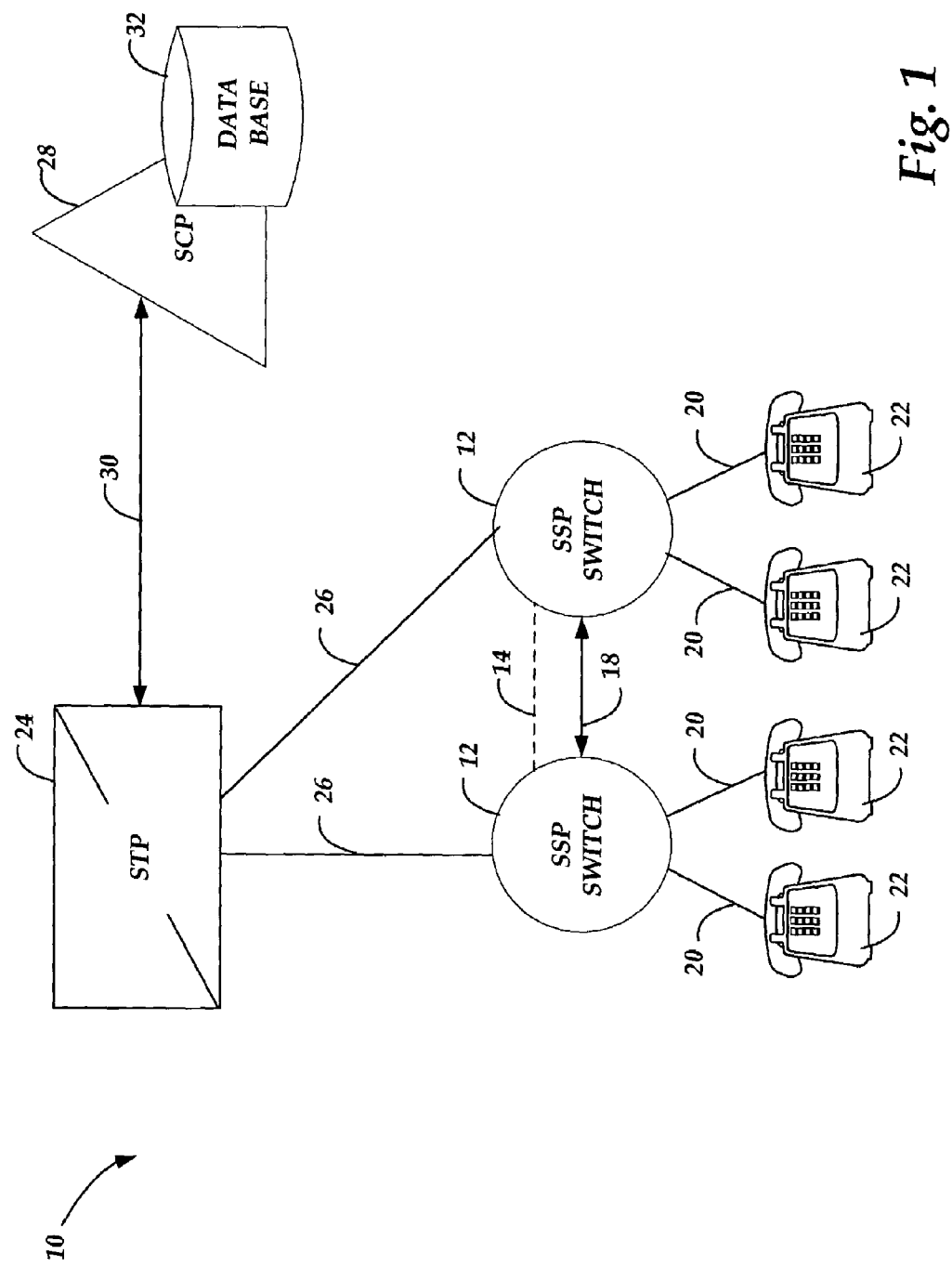
FIG. 1 is a block diagram showing an AIN for integration with a public switched telephone network utilized as an operating environment in one embodiment of the present invention.

It is to be understood that the figures and descriptions of the present invention have been simplified to illustrate elements that are relevant for a clear understanding of the present invention, while eliminating, for purposes of clarity, other elements of a conventional telecommunications network. For example, certain operating system details and modules of certain of the intelligent platforms of the network are not described herein. Those of ordinary skill in the art will recognize, however, that these and other elements may be desirable in a typical telecommunications network. However, because such elements are well known in the art, and because they do not facilitate a better understanding of the present invention, a discussion of such elements is not provided herein.

The term "calling party" is used herein generally to refer to the person or unit that initiates a telecommunication. The calling party may also be referred to herein as "caller." In some cases, the calling party may not be a person, but may be a device such as a facsimile machine, an answering service, a modem, etc. The term "called party" is used herein generally to refer to the person or unit that answers or responds to the call or communication. The term "communication" is used herein to include all messages or calls that may be exchanged between a calling party and a called party, including voice, data and video messages. The term "communication" is used synonymously herein with the term "call" unless a distinction is noted. The term "subscriber" is used herein to generally refer to a subscriber of the described telecommunications service.

The present invention is directed, according to one embodiment, to a system and method for providing a telecommunications extension service for a service subscriber. According to one embodiment of the service, when a calling party places an incoming call to, for example, a residential telephone or some other telecommunications unit that the subscriber has designated as the host telecommunications unit, not only does the subscriber's unit ring, but also other telecommunications units associated with the subscriber. Accordingly, if the subscriber is away from their telecommunications unit, the subscriber does not have to miss the call. According to other embodiments of the present invention, the subscriber may specify any number of wireline, wireless, and voice over Internet protocol (VoIP) numbers to be rung when a call is directed to one of the subscriber's telecommunications units designated as the host telecommunications unit.

According to further embodiments, the subscriber may respond to the communication on one of the units, and after the subscriber responds, another party may respond to the same communication on one of the other units associated with the subscriber, resulting in the subscriber and the other party being connected as a conference call to the communication such that the subscriber, other party, and calling party may all engage in the communication. In addition, once one of the telecommunications units is answered, the service notifies the other telecommunications units associated with the subscriber that the call has been connected.

The telecommunications extension service according to an embodiment of the present invention monitors the conference call between the subscriber, other party, and calling party for disconnection of one or more of the units from the call. In response to detecting the disconnection of either the subscriber or the other party, the service disconnects the communication from the disconnecting unit such that the conference call between the calling party and the unit remaining connected to the call is uninterrupted. In response to detecting the disconnection of either the calling party or both the subscriber and the other party, the service disconnects the communication and notifies each of the telecommunications units associated with the service that the communication with the calling party has been disconnected.

In addition, when a call is in progress between the calling party and one of the telecommunications units, the other telecommunications units associated with the service remain fully functional as conventional telecommunications units. For example, if a subscriber is engaged with a calling party on one of the telecommunications units, then the other telecommunications units not involved in the call can be used for other telecommunication purposes, without interfering with the call in progress between the subscriber and the calling party.

According to one embodiment, the system utilizes the intelligent functionality of an Advanced Intelligent Network (AIN). The AIN is a network used in conjunction with a conventional telephone network, such as the Public Switched Telephone Network ("PSTN"), to provide enhanced voice and data services and dynamic routing capabilities using two different networks. The actual voice call is transmitted over a circuit-switched network, but the signaling is done on a separate packet-switched network. Before describing details of the system of the present invention, a description of the AIN is provided.

FIG. 1 is a block diagram showing an illustrative AIN 10 for integration with the PSTN. The AIN 10 may be employed by a Local Exchange Carrier ("LEC"), and may be utilized by the LEC to allow the LEC to provide call processing features and services that are not embedded within conventional switching circuits of the PSTN.

A typical LEC includes a number of central offices for interconnecting customer premises terminating equipment with the PSTN. For a LEC including the AIN 10 as illustrated in FIG. 1, the central offices may include one or more Service Switching Point ("SSP") switches 12. A dashed line 14 between the SSP switches 12 indicates that the number of SSP switches 12 in the AIN 10 may vary depending on the particular requirements of the AIN 10. The AIN 10 may also include non-SSP switches. The difference between the SSP switches 12 and non-SSP switches is that the SSP switches 12 provide intelligent network functionality. Interconnecting the SSP switches 12 are communication links 18 which may be, for example, trunk circuits.

Each SSP switch 12 has a number of subscriber lines 20 connected thereto. The subscriber lines 20 may be, for example, conventional twisted pair loop circuits connected between the switches 12 and the telephone drops for the customer premises. The subscriber lines 20 may also comprise trunk circuits, such as T-1 trunk circuits. Typically, the number of subscriber lines 20 connected to each switch 12 is on the order of ten thousand to one hundred thousand lines. Each of the subscriber lines 20 is connected to a terminating piece of customer premises equipment, represented in FIG. 1 by wireline telephones 22. Alternatively, the terminating equipment may be other types of telecommunications units such as, for example, a telecopier, a personal computer, a modem, or a private branch exchange ("PBX") switching system.

For the AIN 10 illustrated in FIG. 1, each SSP switch 12 is connected to a signal transfer point ("STP") 24 via a communication link 26. The communication link 26 may employ, for example, the SS7 switching protocol. The STP 24 may be a multi-port high-speed packet switch that is programmed to respond to the routing information in the appropriate layer of the switching protocol, and route the data packets to their intended destination.

One of the intended destinations of the data packets from the STP 24 is a service control point ("SCP") 28. The STP 24 is in communication with the SCP 28 via a communication link 30, which may also employ the SS7 switching protocol. The SCP 28 may be an intelligent database server such as, for example, an Intelligent Network Service Control Point available from LUCENT TECHNOLOGIES INC., Murray Hill, N.J., and may have associated with it a network database 32 for storing network data. The intelligent functionality of the SCP 28 may be realized by application programs, such as programmable Service Program Applications ("SPA"), which are run by the SCP 28. The SCP 28 is normally employed to implement high volume routing services, such as call forwarding and number portability translation and routing. In addition, another of the functions of the SCP 28 is hosting of the network database 32, which may store subscriber information, such as subscriber call management profiles, used in providing enhanced calling services, such as the telecommunications extension service described herein.

According to one embodiment of the present invention, the network database 32 stores a list of telephone numbers that should be simultaneously rung when a telephone call is placed through the subscriber's telecommunications unit designated as the host telecommunications unit. According to this embodiment of the present invention, the subscriber may specify multiple wireline, wireless, and VoIP telephone numbers. In particular, the subscriber provides the telephone number associated with the telecommunications unit to be designated as the host telecommunications unit and accorded the telecommunications extension service and the telephone numbers for the telecommunications units that are to serve as the extensions of the subscriber's telecommunications unit and be simultaneously rung when a call directed to the subscriber's telecommunications unit is received. The subscriber may identify these numbers through the use of a voice driven administration system. Access to the administration system may be provided through caller ID information received from the subscriber's wireless or wireline telephone numbers. If no caller ID is received from the subscriber's telecommunications unit, the subscriber may be prompted to provide a telephone number and PIN to identify their account. Once the subscriber has gained access to the administration system, the subscriber may be permitted to add or remove numbers to be simultaneously rung and to change the telecommunications unit designated as the host telecommunications unit. These numbers may be stored in the network database 32 and retrieved when a call is directed to the subscriber's host telecommunications unit. According to alternative embodiments of the present invention, a WWW site may be provided at which the subscriber can administer the list of numbers to be rung simultaneously. Additional details regarding the embodiment of the present invention for ringing multiple subscriber telephone numbers will be described in greater detail below with reference to FIGS. 3A-3D.

In order to keep the processing of data and calls as simple as possible at the switches, such as at the SSP switches 12, a set of triggers may be defined at the SSP switches 12 for each call. A trigger in the AIN 10 is an event associated with a particular subscriber line 20 that generates a query that is sent from the SSP switch 12 servicing the particular subscriber line 20 to the SCP 28 via the STP 24. The triggers may be originating triggers for calls originating from the subscriber premises or terminating triggers for calls terminating at the subscriber premises. A trigger causes a message in the form of a query to be sent from the SSP switch 12 to the SCP 28.

The SCP 28 in turn interrogates the database 32 to determine whether some customized call feature or enhanced service should be implemented for the particular call, or whether conventional dial-up telephone service should be provided. The results of the database inquiry are sent back from the SCP 28 to the SSP switch 12 via the STP 24. The return packet includes instructions to the SSP switch 12 as to how to process the call. The instructions may be to take some special action as a result of a customized calling service or enhanced feature. For example, if a list of telecommunications units has been identified to be simultaneously rung, then the return message from the SCP 28 may include instructions for the SSP switch 12 to route the call to each telephone number associated with the plurality of telecommunications units. In addition, the return message from the SCP 28 may simply be an indication that there is no entry in the database 32 that indicates anything other than conventional telephone service should be provided for the call. The query and return messages may be formatted, for example, according to conventional SS7 Transaction Capabilities Application Part ("TCAP") formats. U.S. Pat. No. 5,438,568, which is incorporated herein by reference, discloses additional details regarding the functioning of a conventional AIN.

The AIN 10 illustrated in FIG. 1 includes only one STP 24, one SCP 28, and one network database 32, although the AIN 10 may further include an additional number of these components as well as other network components which not are included in FIG. 1 for purposes of clarity. For example, the AIN 10 may additionally include redundant SCPs and STPs to take over if the STP 24 or the SCP 28 should fail. In addition, the AIN 10 may include an Automatic Electronic Switching System ("AESS") Network Access Point ("NAP") in communication with the STP 24, which may be programmed to detect the trigger conditions. The AIN 10 may also include a service node connected to one or more of the SSP switches 12 for use when some enhanced feature or service is needed that requires an audio connection to the call such as, for example, call return and calling name services. Further, the AIN 10 may include regional STPs and regional SCPs in communication with, for example, the local STP 24, for routing and servicing calls between different LECs.

Figure 2:
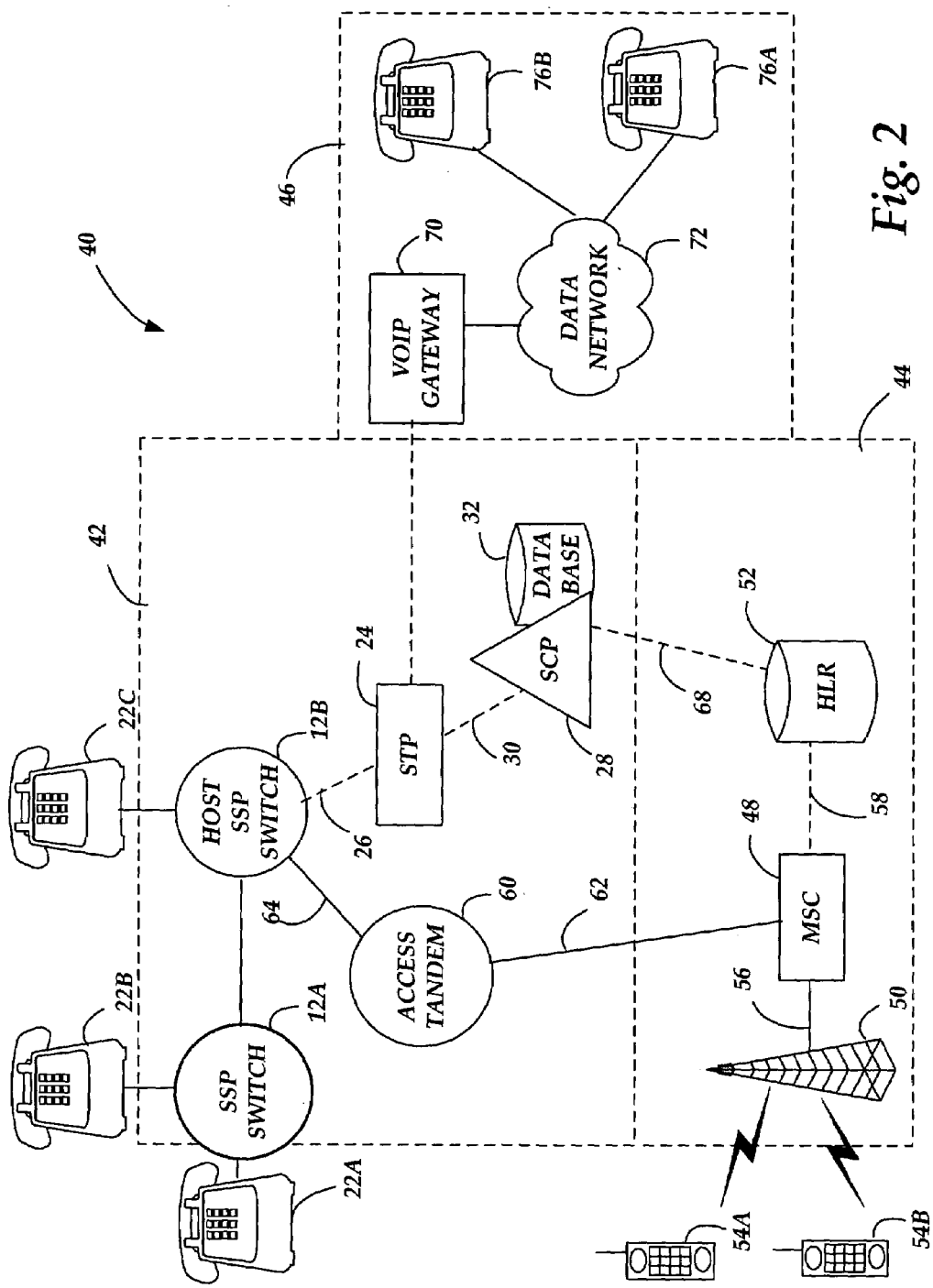
FIG. 2 is a block diagram showing a system provided according to one embodiment of the present invention.
Figure 3A:
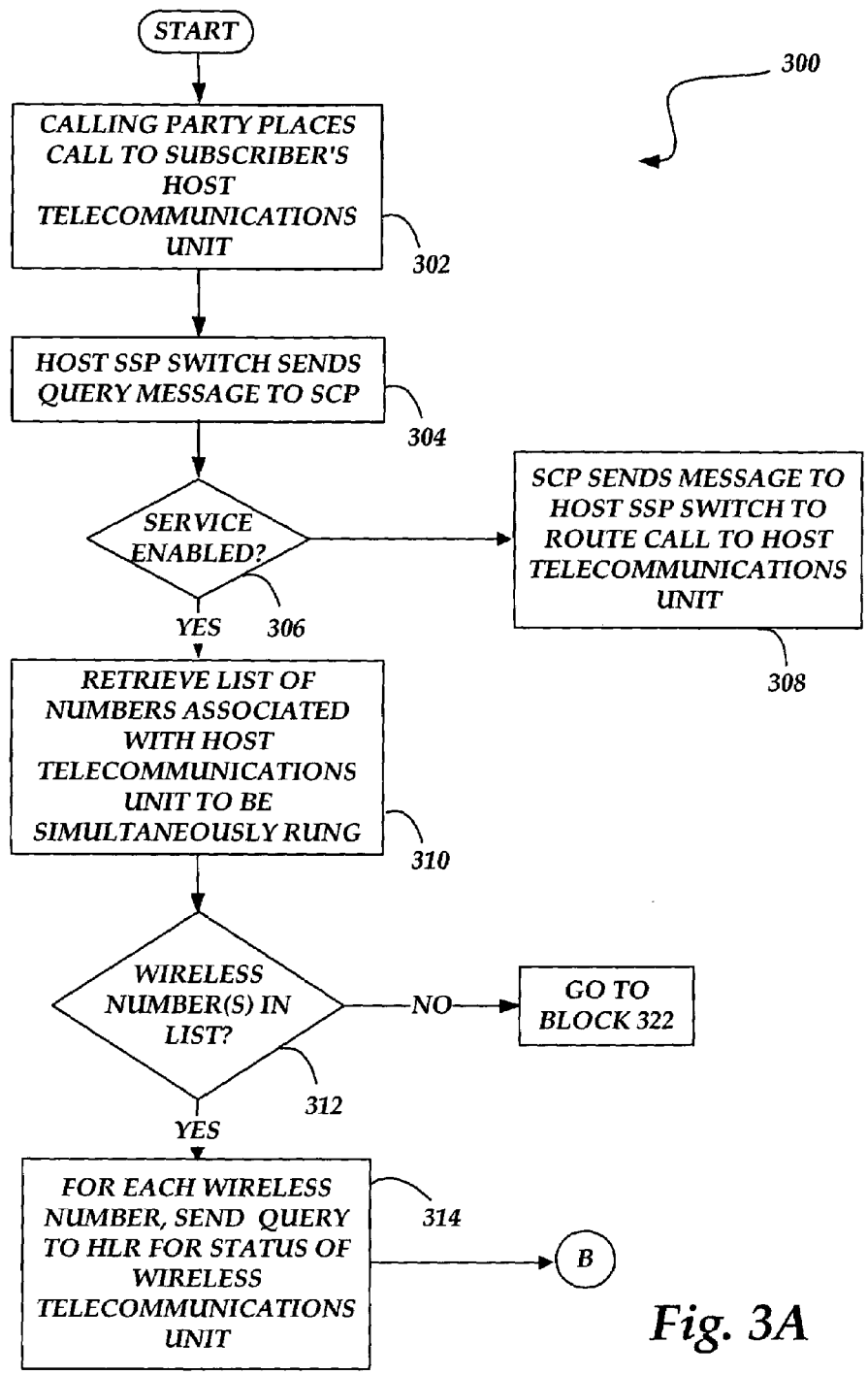
FIGS. 3A-3D are flow diagrams showing an illustrative process for providing a telecommunications extension service according to the disclosed embodiment of the present invention.
Figure 3B:
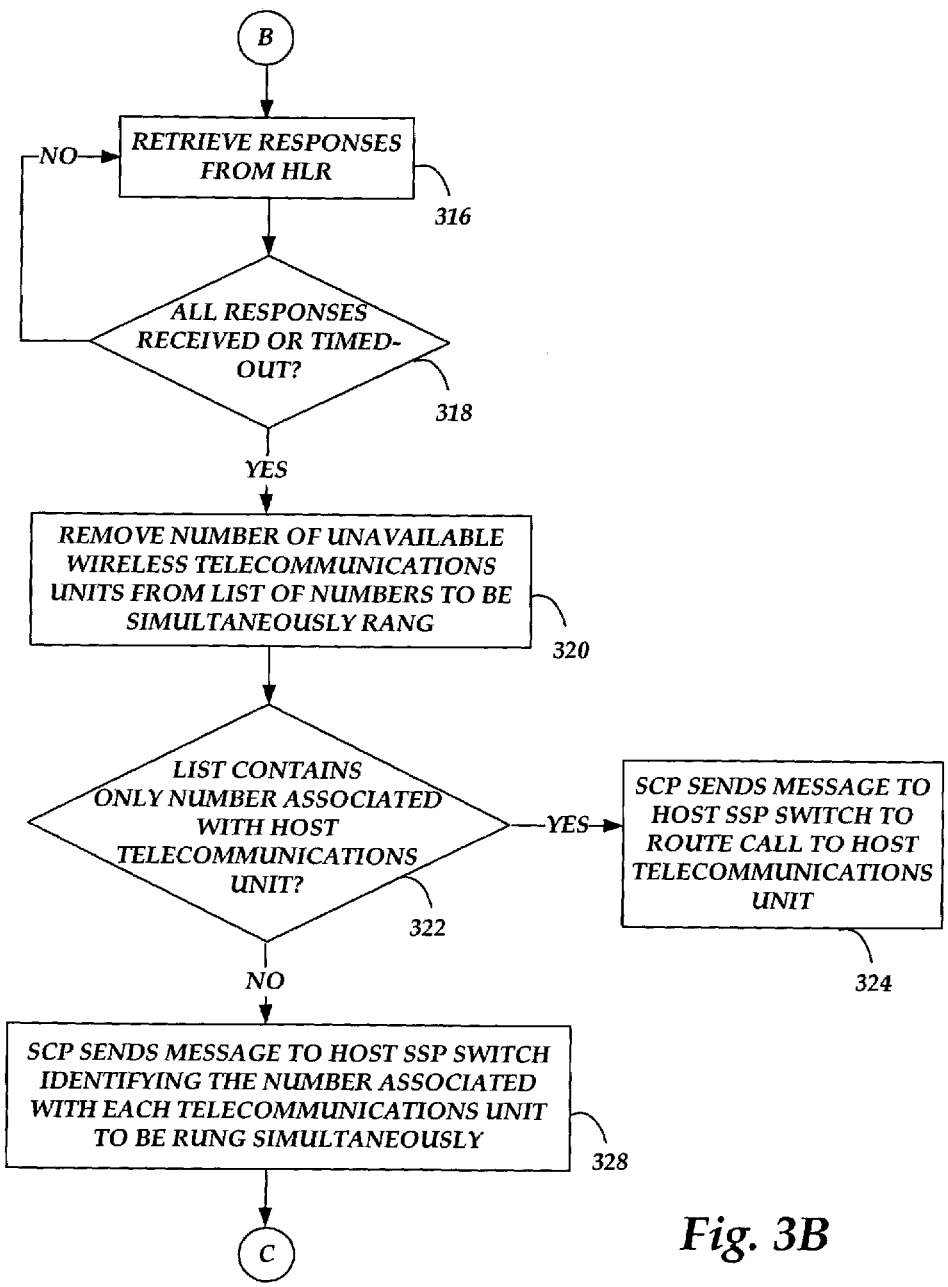
Figure 3C:
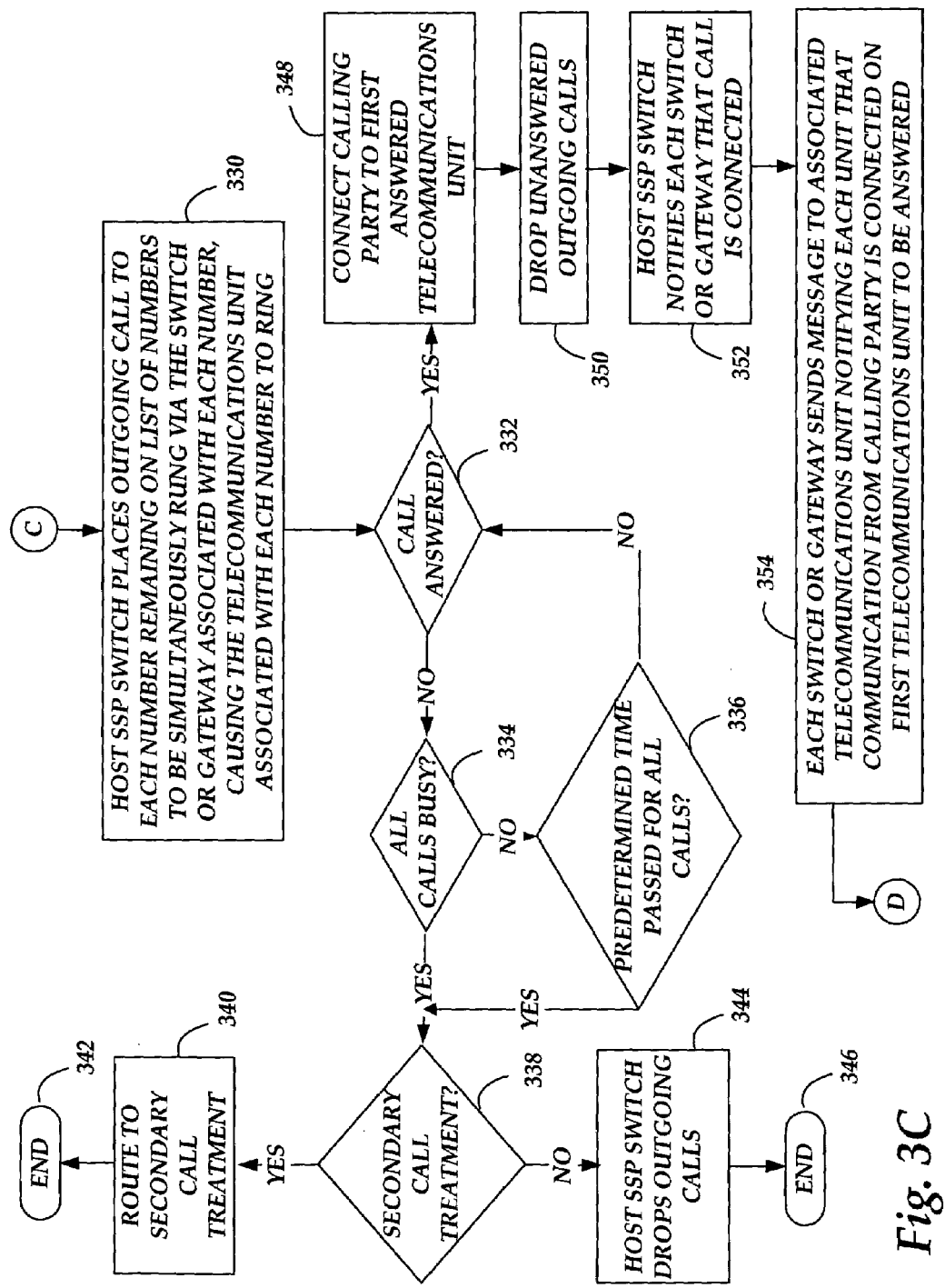
Figure 3D:
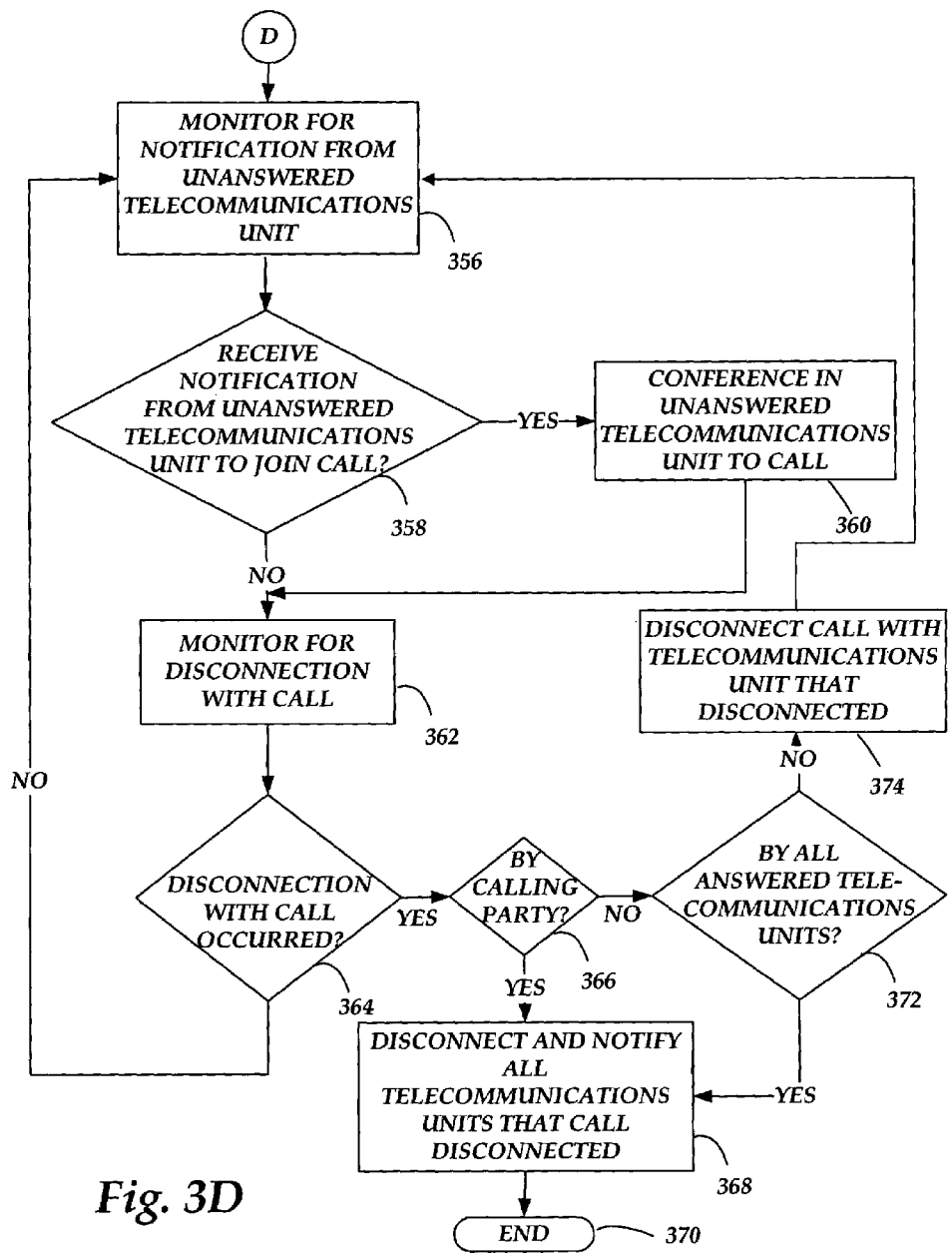

As discussed briefly above, the present invention is directed, according to one embodiment, to a system for providing a telecommunications extension service for a service subscriber. FIG. 2 is a diagram of a system 40 according to one such embodiment. The system 40 includes a wireline network 42, a wireless network 44, and an IP network 46. The wireline network 42 includes portions of the AIN 10 as described in conjunction with FIG. 1, including the SSP switches 12A-12B, the STP 24, and the SCP 28. The SSP switch 12A is in communication with wireline telecommunications units 22A and 22B, and the SSP switch 12B is in communication with wireline telecommunications unit 22C. For purposes of clarity, other elements of the AIN 10 are not shown in FIG. 2.

The wireless network 44 includes a mobile switching center ("MSC") 48, a base transceiver station ("BTS") 50, and a home location register ("HLR") 52. The MSC 48 is in communication with one or more wireless telecommunications units 54A and 54B, such as a wireless telephone as illustrated in FIG. 2, via the BTS 50. The BTS 50 may communicate with wireless telecommunications units 54A and 54B according to an air-interface communication scheme such as but not limited to, for example, AMPS (ANSI-553), TDMA (IS 136), CDMA (IS-95), or GSM. The BTS 50 may be in communication with the MSC 48 via the communications link 56. The MSC 48 is an automatic switching system in a wireless telecommunications network that acts as the interface for subscriber traffic between the wireless network 44 and the wireline network 42 or other MSCs in the same or other wireless networks. The MSC 48 performs the same general function as a SSP switch in a wireline based system. In addition, the MSC 48 supports incoming calls through a radio telecommunications front-end, as well as handoff and roaming functions. Accordingly, the MSC 48 may include wireless intelligent network ("IN") functionality for detecting originating and terminating triggers.

The MSC 48 may be in communication with the HLR 52 via a communications link 58 which may, for example, be an SS7 signaling protocol link. The HLR 52 is a location register to which the user identity of a wireless telecommunications unit, such as the wireless telephone 54A, is assigned for record purposes. The HLR 52 may register subscriber information relating to the wireless telecommunications units such as, for example, profile information, current location, and authorization period. When the MSC 48 detects a wireless telecommunications unit entering the MSC's service area, the MSC 48 performs a registration process that includes requesting subscriber profile information from either the HLR 52 or a visitor location register ("VLR") (not shown), depending upon whether the wireless telephone 54A is within its home location or within a visitor location. Typically for integrated wireless networks, the VLR assigned to the service area of a visiting wireless subscriber is updated with information from the HLR associated with the wireless subscriber's wireless service provider ("WSP"). Accordingly, the MSC 48 servicing a particular area has access to information regarding each of the wireless users presently in its service area.

The wireline network 42 additionally includes a tandem office 60, which provides a switching interface between the wireline network 42 and the wireless network 44. The tandem office 60 may be in communication with the MSC 48 via a communications link 62, which may be, for example, a trunk circuit or an ISDN circuit. In addition, the tandem office 60 may be in communication with one or more of the SSP switches (such as the SSP switch 12B as illustrated in FIG. 2) via communications links 64, which may be, for example, trunk circuits. In addition, the SCP 28 may be in communication with the HLR 52 of the wireless network 44 via a communications link 68 employing, for example, the IS-41 signaling protocol. For clarity in FIG. 2, communications links that are used exclusively for signaling (e.g., no call data) are illustrated with dashed lines, and communications links that transfer signaling and/or call data are illustrated with solid lines.

The IP network 46 includes a VoIP gateway 70 and a data network 72. The VoIP gateway 70 is in communication with one or more telecommunications units 76A and 76B, such as an IP telephone as illustrated in FIG. 2, via the data network 72. The data network 72 may be a wired or a wireless data network. The VoIP gateway 70 provides signaling exchanges between the wireline network 42 and the IP network 46 and enables end-to-end call setup and tear down across the two networks. In addition, the VoIP gateway 70 exchanges voice and other communications between the wireline network 42 and the IP network 46. The VoIP gateway 70 of the IP network 46 is in communication with the STP 24 of the wireline network 42.

FIGS. 3A-3D provide a process flow for implementing the telecommunications extension service according to one embodiment of the present invention wherein any number of telecommunications units may be associated with the service and rung simultaneously. A process 300 is described herein with reference to the system 40 illustrated in FIG. 2, with the wireline telephone 22A being associated with the calling party, the wireline telephone 22C being designated by the subscriber as the host telecommunications unit to be accorded the telecommunications extension service, and the wireline telephone 22B, the wireless telephone 54B, and the IP telephone 76A being designated as extensions of the wireline telephone 22C. As described briefly above, the subscriber may utilize a voice activated administration system or a WWW site to provide the directory number of the telecommunications unit to be designated the host telecommunication unit and accorded the telecommunications extension service and a list of numbers that are to serve as the extensions of the host telecommunications unit and be simultaneously rung along with the host telecommunications unit. The directory number associated with the telecommunications unit identified by the subscriber as the host telecommunications unit and the list of numbers identified by the subscriber to serve as extensions of the host telecommunications unit and to be simultaneously rung along with the host telecommunications unit are stored in the database 32. For instance, as discussed above, the subscriber may specify that the wireline telephone 22C be the host telecommunications unit, and the wireline telephone 22B, the wireless telephone 54B, and the IP telephone 76A be rung simultaneously when an incoming communication is received directed toward the subscriber's wireline telephone 22C. The telephone numbers associated with the wireline telephones 22B and 22C, the wireless telephone 54B, and the IP telephone 76A are stored in the database 32. Numbers of other telephones to be simultaneously rung may also be stored in the database 32. As will be described in greater detail below, when an incoming communication is received from the wireline telephone 22A directed toward the subscriber's wireline telephone 22C, the wireline telephone 22B, the wireless telephone 54B, and the IP telephone 76A will be rung simultaneously. Any number of other telephones identified by the subscriber may also be rung in a similar manner. Of course, the calling party need not initiate the call from a wireline telecommunications unit, but instead may initiate the call from a wireless telecommunications unit or an IP telecommunications unit that is routed to the SSP switch associated with the subscriber's telecommunications unit.

The process 300 begins at block 302 with the calling party placing a call to the wireline telephone 22C associated with the called party, the called party being a subscriber of the telecommunications extension service. From block 302, the process 300 continues to block 304, where the host SSP switch 12B associated with the subscriber's wireline telephone 22C, having been provisioned with a Terminating Attempt Trigger ("TAT") specific to the simultaneous ring service for the subscriber, launches a TERMINATION_ATTEMPT query message to the SCP 28 in response to triggering of the TAT by the incoming call. Upon receiving the query message, the SCP 28 determines whether the subscriber currently has the telecommunications extension service activated at block 306. The SCP 28 may perform this function by interrogating the SCP database 32. If the service is not currently activated, the process 300 branches to block 308, where the SCP 28 instructs the host SSP switch 12B to route the call to the wireline telephone 22C without simultaneously ringing any other telephones.

If, at block 306, the SCP 28 determines that the telecommunications extension service is activated, the process 300 continues to block 310. At block 310, the SCP 28 retrieves, from the database 32, the list of telephone numbers associated with the telephone number of the wireline telephone 22C to be simultaneously rung. The process 300 then continues to block 312, where the SCP 28 determines whether any telephone numbers corresponding to wireless telephones are identified in the list of phone numbers to be simultaneously rung. If any wireless telephone numbers are contained in the list, the process 300 branches to block 314. At block 314, the SCP 28 queries the HLR 52 for the status of the wireless telephone units associated with each of the wireless telephone numbers identified in the list of numbers to be simultaneously rung. As described above, the SCP 28 may accomplish this by transmitting an IS-41 location request message to the HLR 52. It should be appreciated that the SCP 28 may transmit such messages to a variety of HLRs associated with the particular wireless telephone units. From block 314, the process 300 continues to block 316. If no wireless telephone numbers are contained in the list, then the process 300 continues from block 312 to block 322.

At block 316, responses are received at the SCP 28 from the queried HLR 52. These responses indicate the status of the wireless telephone units for which a query message was previously sent to the HLR 52 at block 314. In some situations, an HLR 52 may not respond to the request within a predetermined period of time. If the HLR 52 fails to respond in this predetermined period of time, the HLR 52 will be deemed to have timed-out.

From block 316, the process 300 continues to block 318, where a determination is made by the SCP 28 as to whether replies have been received in response to each of the query messages or whether these requests timed-out. If responses have not been received or have not timed-out, the process 300 returns to block 316 where additional responses are received. If all the queries have been responded to or have timed-out, the process 300 continues from block 318 to block 320.

At block 320, the SCP 28 removes the numbers associated with the wireless telephones for which a response was received indicating that the telephone was unavailable or for which a response timed-out from the list of numbers to be simultaneously rung. In this manner, calls will not be set up directed to wireless telephones to which a communication could not be completed.

From block 320, the process 300 continues to block 322, where the SCP 28 determines whether the list of numbers to be rung contains only the called number. If the list contains only the called number, the process 300 branches to block 324, where the SCP 28 sends a message to the host SSP switch 12B to route the call to the wireline telephone 22C. In this manner, a call will be completed directly to the wireline telephone 22C where the number of the wireline telephone 22C is the only number remaining in the list of numbers to be rung after status responses have been received from the HLR 52. From block 324, the process 300 continues to block 326, where it ends.

If, at block 322, the SCP 28 determines that the list of numbers to be rung simultaneously contains additional numbers other than the called telephone number, the process 300 continues to block 328. At block 328, the SCP 28 sends a message to the host SSP switch 12B identifying the number that was dialed by the calling party. In this instance, the host SSP switch 12B receives the telephone number associated with wireline telephone 22C. The host SSP switch 12B uses this telephone number to look up the list of numbers that are to serve as extensions to the telephone number and be simultaneously rung. Alternatively, the list of numbers may be part of the message that the host SSP switch 12B receives from the SCP 28. The process 300 then continues from block 328 to block 330. As will be described in greater detail below, the message from the SCP 28 is utilized by the host SSP switch 12B to set up calls directed to each of the telephone lines to be simultaneously rung.

At block 330, the host SSP switch 12B places outgoing calls to each of the numbers remaining on the list of numbers to be simultaneously rung. For instance, if the subscriber identifies the wireline telephone 22B, the wireless telephone 54B, and the IP telephone 76A to serve as extensions of the subscriber's wireline telephone 22C, then the host SSP switch 12B places an outgoing call to the wireline telephone 22C, the wireline telephone 22B, the wireless telephone 54B, and the IP telephone 76A. Typically, the call to each of the telecommunications units associated with the numbers on the list will be routed from the host SSP switch to the switch or gateway associated with each of the telecommunications units. The switch or gateway associated with each of the numbers receives the outgoing call from the host SSP switch and sends an appropriate indication to the telecommunications unit associated with each of the numbers, such as ringing the wireline and wireless telecommunications units or sending a Session Internet Protocol (SIP) invite message to the IP telecommunications units.

From block 330, the process 300 proceeds to block 332, where the host SSP switch 12B determines whether one of the outgoing calls placed to each of the numbers remaining on the list of numbers to be simultaneously rung has been answered. If, at block 332, the host SSP switch 12B determines that no call has been answered, the process 300 continues to block 334, where the host SSP 12B determines whether all the telecommunications units are busy. If all the telecommunications units are not busy, then the process 300 proceeds to block 336, where the host SSP switch 12B determines whether a predetermined time has passed since the outgoing calls were placed without the calls being answered. If such a predetermined period of time has expired, the calls are considered to have timed-out. If the predetermined period of time has not elapsed, the process 300 returns to block 332 where the host SSP switch 12B again determines whether the call has been answered. If the calls have timed-out at block 336, the process 300 continues to block 338, where the host SSP switch 12B determines whether secondary call treatment is to be accorded. Such secondary call treatment may include voicemail, call forward no answer, or other treatment depending on the subscription of the subscriber. If secondary call treatment is to be accorded, then the process 300 continues to block 340 where the communication is routed to second call treatment as appropriate, and the process ends at block 342. If secondary call treatment is not to be accorded, then the process 300 continues to block 344 where each of the outgoing calls is dropped by the host SSP switch 12B. The process 300 then continues to block 346 where it ends. If, back at block 334, the host SSP switch 12B determines that all of the telecommunications units are busy, then the process 300 proceeds to block 338 et seq. as described above.

If, however, at block 332, the host SSP switch 12B determines that one of the outgoing telephone calls has been answered, then the process 300 branches to block 348. At block 348, the host SSP switch 12B connects the calling party to the first answered telecommunications unit. From block 348, the process 300 then continues to block 350 where the host SSP switch 12B drops each of the outgoing calls to the unanswered telecommunications units. For example, if the wireless telephone 54B is the first telecommunications unit to be answered, then the host SSP switch 12B connects the communication from the calling party with the wireless telephone 54B and drops the outgoing calls to the wireline telephone 22B, the wireline telephone 22C, and the IP telephone 76A.

Thereafter, at block 352, the host SSP switch 12B sends a message to each switch or gateway associated with the telecommunications units that were simultaneously rung, other than the first to be answered, notifying the switches or gateways that the communication from the calling party is connected on the first telecommunications unit to be answered. At block 354, each of the switches or gateways sends a message to the associated telecommunications unit notifying the unit that the communication from the calling party is connected on the first telecommunications unit to be answered. From the example above, after the wireless telephone 54B is answered first and the other outgoing calls are dropped, the host SSP switch 12B sends a message to the SSP switch 12A and the VoIP gateway 70 notifying the switch and gateway that the communication is connected on the wireless telephone 54B. In response, the host SSP switch 12B, the SSP switch 12A, and the VoIP gateway 70 send a notification to the wireline telephone 22C, the wireline telephone 22B, and the IP telephone 76A, respectively, that the communication is connected on the wireless telephone 54B. For a wireline telephone, the corresponding switch may set an internal indicator that that the number associated with the telecommunications unit to be answered first is connected. Alternatively, the switch corresponding to a wireline telephone may send a "ping ring" or other short distinctive ring to the wireline telephone to indicate that the communication from the calling party has been connected to another telecommunications unit on the list of units to be simultaneously rung. For a wireless telephone, the corresponding switch may send a Short Message Service (SMS) message or other message to indicate that the communication from the calling party has been connected to another telecommunications unit on the list of units to be simultaneously rung. For a VoIP telephone, the corresponding switch may send an IP message to place an indicator next to the phone number associated with the telecommunications unit to be answered first to indicate that the communication is in progress on that phone number.

From block 354, the process 300 proceeds to block 356, where the host SSP switch 12B monitors to determine if one of the switches or gateways associated with one of the unanswered telecommunications units has sent a message requesting that the unanswered telecommunications unit be connected to the communication in progress between the calling party and the first telecommunications unit to be answered. If a user of an unanswered telecommunications unit determines to join the in-progress communication, the user may take an action to become connected to the in-progress communication. Each of the switches or gateways associated with the telecommunications units are provisioned with special features to recognize certain actions taken by users of the telecommunications units as request to connect to the communication in progress between the calling party and the first telecommunications unit to be answered and to forward the request to connect to the host SSP switch 12B. If the unanswered telecommunications unit is a conventional wireline telephone, a user may take the action of going off-hook to trigger a connection request. The switch associated with the unanswered wireline telephone recognizes the action of going off-hook as a request to connect to the in-progress call between the calling party and the first telecommunications unit to be answered. In response, the switch sends a message to the hosting SSP switch 112B indicating that the user of the unanswered wireline telephone wants to be connected to the communication between the calling party and the first telecommunications unit to be answered.

If the unanswered telecommunications unit is a wireless telephone, the user may take the action of responding to the SMS message to trigger a connection request, which is received by the switch associated with the unanswered wireless telephone. The switch associated with the unanswered wireless telephone recognizes the action of responding to the SMS message as a request to connect to the in-progress call between the calling party and the first telecommunications unit to be answered. In response, the switch sends a message to the hosting SSP switch 112B indicating that the user of the unanswered wireless telephone wants to be connected to the communication between the calling party and the first telecommunications unit to be answered. Alternatively, a user of an unanswered wireless telephone may take the action of selecting a button or soft-button on the wireless telephone to trigger the connection request.

If the unanswered telecommunications unit is a VoIP telephone, a user of the unanswered VoIP telephone may take any of the actions discussed above with regards to wireline and wireless telephones to trigger the connection request.

In another embodiment of the present invention, a user may dial a specific code or telephone number associated with the telecommunications extension service, using any of the telephones discussed above, to place a call from the user's telephone to the host SSP switch 12B. The host SSP switch 12B may use the directory number associated with the user's telephone to interpret incoming call from the user's telephone as a request to be connected with the communication between the calling party and the first telecommunications unit to be answered.

If, at block 358, the host SSP switch 12B receives a message from one of the switches or gateways associated with one of the unanswered telecommunications units requesting that the unanswered telecommunications unit be connected to the communication in progress between the calling party and the first answered telecommunications unit, the process branches to block 360, where the host SSP switch 12B connects the unanswered telecommunications unit to the communication between the calling party and the first answered telecommunications unit, and the process 300 proceeds to block 362.

If, however, at block 358, the host SSP switch 12B does not receive a message from one of the switches or gateways associated with one of the unanswered telecommunications units requesting that the unanswered telecommunications unit be connected to the communication in progress, then the process 300 proceeds to block 362, where the host SSP switch 12B monitors to determine if a disconnection with the communication has occurred. If, at block 364, the host SSP switch 12B determines that a disconnection has occurred, then the process 300 proceeds to block 366, where the host SSP switch 12B determines if the calling party disconnected from the communication. If, at block 366, the host SSP switch 12B determines that the calling party disconnected, then the process 300 proceeds to block 368, where the host SSP switch 12B disconnects the communication with the calling party and sends a notification to each of the telecommunications units to be simultaneously rung, via the associated switch or gateway, that the communication is disconnected. From block 368, the process 300 continues to block 370, where it ends.

If, back at block 366, the host SSP switch determines that the calling party did not disconnect from the communication, then the process 300 proceeds to block 372, where the host SSP switch 12B determines if all the answered telecommunications units connected to the communication have disconnected from the communication. If all of the answered telecommunications units have disconnected from the communication, then at block 366, the host SSP switch 12B disconnects the communication with the calling party and sends a notification to each of the telecommunications units to be simultaneously rung, via the associated switch or gateway, that the communication is disconnected. From block 368, the process 300 continues to block 370, where it ends. If, however, at block 372, the host SSP switch 12B determines that all of the answered telecommunications units have not disconnected from the communication, then at block 374, the host SSP switch 12B disconnects the communication from the answered telecommunications unit that disconnected, without interfering with the communication between the calling party and remaining answered telecommunications units. Thereafter, the process 300 returns back to block 356 et seq., where the host SSP switch 12B monitors to determine if one of the switches associated with one of the unanswered telecommunications units has sent a message requesting that the unanswered telecommunications unit be connected to the communication in progress between the calling party and the first telecommunications unit to be answered.

Although the present invention has been described herein with respect to certain embodiments, those of ordinary skill in the art will recognize that many modifications and variations of the present invention may be implemented. For example, although the host SSP switch 12B was described for the processing of the telecommunications extension service, one skilled in the art will appreciate that other programmable network elements with appropriate functionality, such as a service node, may provide such processing. The foregoing description and the following claims are intended to cover all such modifications and variations.

The invention claimed is:

1. A method for providing a telecommunications extension service for subscriber, comprising:
receiving at a plurality of telecommunications units a signal indicating an incoming call from a calling party, wherein the plurality of telecommunications units simultaneously ring in response to receipt of the signal indicating the incoming call;
connecting the calling party and a first answered telecommunications unit when the first answered telecommunications unit answers the incoming call;
terminating each of the incoming calls to the plurality of telecommunications units except for the first answered telecommunications unit;
sending, from at least a second of the plurality of telecommunications units having an incoming call terminated, a request to connect with the first answered telecommunications unit and the calling party to join the call;
in response to receiving the request to connect with the first answered telecommunications unit and the calling party to establish the call, connecting at least the second telecommunications unit with the first telecommunications unit and the calling party; and
in response to the first telecommunications unit terminating the incoming communication, disconnecting the first and the second telecommunications units from the calling party to end the call.

2. The method of claim 1, further comprising:
monitoring the connection between the first telecommunications unit and the second telecommunications unit for disconnection of one unit of the first telecommunications unit and the second telecommunications unit; and
in response to detecting the disconnection of either of the first and second telecommunications units, maintaining the connection with the other telecommunications unit.

3. The method of claim 1, further comprising:
monitoring the connection between the first telecommunications unit and the second telecommunications unit for disconnection of one of the first telecommunications unit, the second telecommunications unit, and the calling party; and
in response to detecting the disconnection of one of the first telecommunications unit, the second telecommunications unit, and the calling party, terminating the call.

4. The method of claim 3, further comprising:
after terminating the call, notifying each of the telecommunications unit that the call has been disconnected.

5. The method of claim 1, further comprising after connecting the first answered telecommunications unit and the calling party, notifying each of the telecommunications units other than the first answered telecommunications unit that the incoming call has been connected.

6. The method of claim 1, further comprising displaying at each of the telecommunications units a notification that the incoming communication is connected.

7. The method of claim 1, further comprising:
in response to receiving at a plurality of telecommunications units a signal indicating an incoming call from a calling party, determining which of the plurality of telecommunications units are available for being simultaneously rung.

8. The method of claim 7, wherein the plurality of telecommunications units include wireline, wireless, and VoIP telecommunications units.

9. The method of claim 8, wherein determining which of the wireline telecommunications units are available includes sending a query message requesting status of the wireline telecommunications units;
   wherein determining which of the wireless telecommunication units are available includes sending a query message to one or more home location registers requesting a status of the wireless telecommunications units; and
   wherein determining which of the VoIP telecommunications units are available includes sending a query message requesting status of the VoIP telecommunications units.

10. A system for providing a telecommunication extension service for a subscriber, comprising:
   programmable service means operative to:
      receive at a plurality of telecommunications units a signal indicating an incoming call from a calling party, wherein the plurality of telecommunications units simultaneously ring in response to receipt of the signal indicating the incoming call; and
      query programmable determination means for processing instructions for the received signal;
   the programmable determination means in communication with the programmable service means operative to:
      provide the processing instructions for processing the incoming call to the programmable service means, wherein the processing instructions include directions to place outgoing communications to the telecommunication units and each of the plurality of other telecommunications units to be simultaneously rung; and
   the programmable service means further operative to:
      receive the processing instructions from the programmable determination means;
      connect the calling party and a first answered telecommunications unit when the first answered telecommunications unit answers the incoming call;
      terminate each of the incoming calls to the plurality of telecommunications units except for the first answered telecommunications unit;
      sending, from at least a second of the plurality of telecommunications units having an incoming call terminated, a request to connect with the first answered telecommunications unit and the calling party to join the call;
      after terminating each of the incoming calls to the plurality of telecommunications units except for the first answered telecommunications unit, connect at least one unanswered telecommunications unit to the first answered telecommunications unit, in response to receiving the request to connect with the first answered telecommunications unit and the calling party to establish the call, wherein the incoming communication remains connected to the first telecommunications unit; and
      in response to the first telecommunications unit terminating the incoming communication, disconnect the first and the at least one unanswered telecommunications units from the calling party to end the call.

11. The system of claim 10, wherein the programmable service means is further operative to:
   monitor the connection between the first answered telecommunications unit and the at least one unanswered telecommunications unit for disconnection of one unit of the first telecommunications unit answered and the at least one unanswered telecommunications unit; and
   in response to detecting the disconnection of either of the first and second telecommunications units, maintain the connection with the other unit.

12. The system of claim 10, wherein the programmable service means is further operative go:
   monitor the connection between the first answered telecommunications unit and the at least one unanswered telecommunications unit for disconnection of one of the first answered telecommunications unit answered, the at least one unanswered telecommunications unit, and the calling party; and
   in response to detecting the disconnection of one of the first telecommunications unit answered, the at least one unanswered telecommunications unit, and the calling party, terminating the call.

13. The system of claim 12, wherein the programmable service means is further operative to notify each of the telecommunications units other than the first answered telecommunications unit and the at least one unanswered telecommunications unit that the incoming cal has been disconnected.

14. The system of claim 10, wherein the programmable service means is further operative to notify each of the telecommunications unit other than the first telecommunications unit to be answered that the incoming call has been connected.

15. The system of claim 10, wherein the programmable determination means is further operative to determine, in response to receiving the incoming call from the calling party, which of the plurality of telecommunications units are available for being simultaneously rung.

16. The system of claim 10, wherein the programmable service means includes a switch.

17. The system of claim 10, wherein the programmable determination means includes a service control point.

* * * * *